April 3, 1934.  F. C. MENK  1,953,862
MATERIAL HANDLING APPARATUS
Filed Sept. 2, 1932  2 Sheets-Sheet 2

Inventor
F.C.Menk
By Knight Bros.
His Attorneys

Patented Apr. 3, 1934

1,953,862

UNITED STATES PATENT OFFICE 1,953,862

MATERIAL HANDLING APPARATUS

Ferdinand C. Menk, Huntington, W. Va.

Application September 2, 1932, Serial No. 631,570

9 Claims. (Cl. 198—139)

This invention relates to a material handling apparatus and more particularly to that type of apparatus designed to unload material such as coal from river vessels to shore stations.

It is the object of this invention to provide an apparatus which is simple and rugged in construction, which is not costly to build, and which is highly practical for the unloading of such material as coal from vessels upon bodies of water of varying level.

It is a further object of the invention to provide a conveyor system for the unloading of material from river vessels to suitable points of distribution upon the shore with a minimum amount of breakage or other damage to the material.

It is a further object of the invention to provide a self-contained movable station of a conveyor system at the river, the position of which may be easily adjusted in accordance with the varying water level, this station having mounted thereon a hopper, feeder, belt conveyor terminal, and loading idlers, in cooperative relationship with each other.

It is an object of this invention automatically to take up the slack in the conveying system upon movement of this station to place the system in position for operation at all times.

It is a further object of the invention to provide a conveying system for materials from the bank of a river to points on shore which is particularly adapted to easy modification, in view of bends in the contour of the bank or in view of existing structures.

Figure 1:
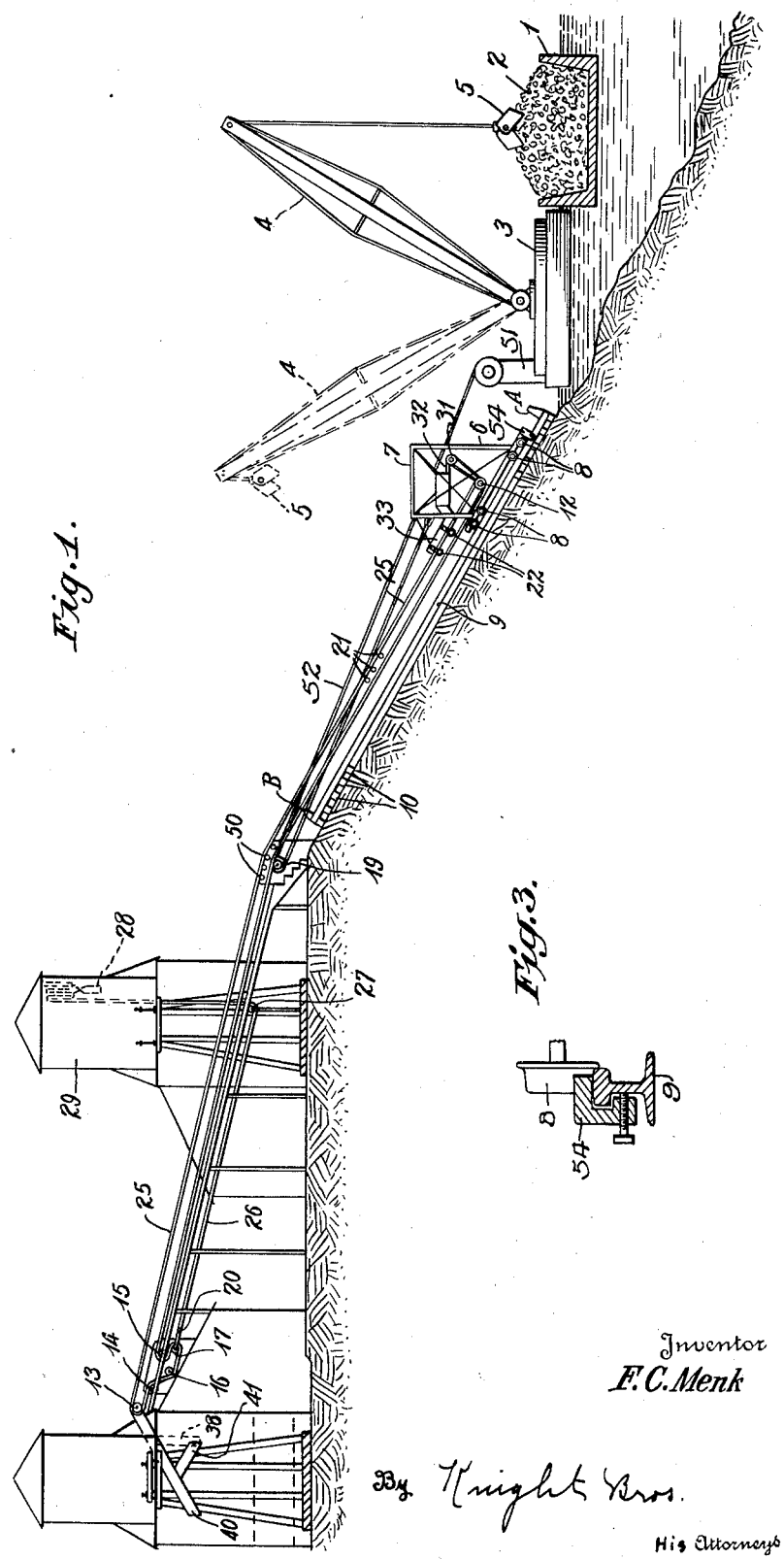
Figure 2:
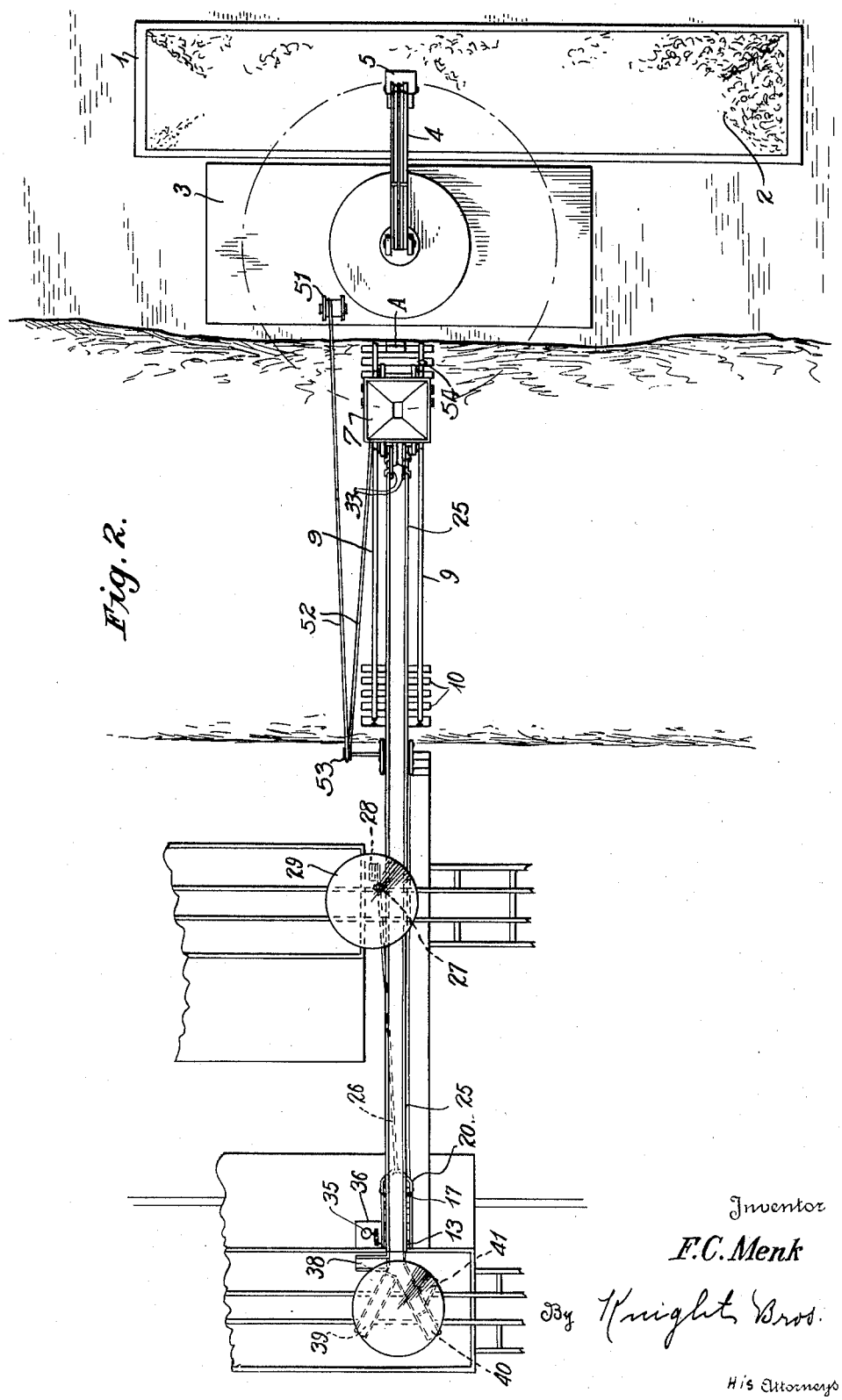

Further objects and purposes will appear from the following detailed description of the invention, taken in conjunction with the accompanying drawings wherein Fig. 1 is a side elevation of the apparatus, Fig. 2 is a plan view thereof, and Fig. 3 is a sectional view of a chock which is used to maintain a part of the apparatus in position.

In the drawings is shown a river vessel such as a coal barge 1 floating in a river adjacent the shore station at which the coal 2 is to be unloaded. Intermediate the barge and the river bank is disposed a float 3 having thereon a crane with a boom 4 and a bucket 5 designed to transfer the coal from the barge to a conveying system upon the bank of the river.

In view of the fact that the level of the river varies from time to time, it is necessary that an adjustable loading station for the coal be provided upon the bank. For this purpose a movable truck or carriage 6 having wheels 8 designed to run along rails 9 mounted upon ties 10 on the river bank, carries a coal receiving hopper 7. This truck or carriage is adapted to be raised to any position along the rails 9 by means of an actuating mechanism such as a winch 51 on the float 3. A cable 52 is directed over a pulley 53 mounted on the apparatus on the bank and may be hooked by its end to the truck 6 for the purpose of raising the latter (Fig. 2). The truck is maintained in its raised position by some jamming means such as a chock 54 (Fig. 3) provided on a rail for adjustment below one of the wheels. The position of the carriage in Fig. 1 is indicated at the point when the river assumes its lowest level. As the water level rises the movable carriage is conformably raised between its limiting positions A and B (Fig. 1).

A roller 12 is journalled in the frame of the truck 6, operating as a terminal for the endless belt conveyor 25 having at its upper end the terminal roller 13 which is driven at a suitable speed by a motor 35 in a housing 36. In order to take up the slack in this endless conveyor, the effective length of which is varied in accordance with the position of the movable carriage 6, a series of idler pulleys is provided adjacent the roller 13. The underside of the conveyor 25 is guided over idlers 14 and 16, is passed over an adjustable idler pulley 17 and another fixed idler pulley 15 in a reverse loop, after which it travels back to roller 12, with an intermediate supporting roller 19 between those two points. Several supporting rollers 19 may be provided to meet varying requirements. Roller 17 is mounted upon a stirrup shaped member 20 to which is connected a cable 26 trained over a roller 27 and tensioned by a suitable counterweight 28. When upward movement of the carriage 6 from its position shown in Fig. 1 results in a shortening of the upper flight of the conveyor 25, counterweight 28 pulls roller 17 away from roller 16 to take up the slack. The counterweight 28 acting upon roller 17 operates constantly to keep the conveyor 25 taut. Counterweight 28 is shown mounted in a housing 29 but such is not necessary for the purpose of the invention, and this counterweight may as well be in the open as are the other elements of the apparatus.

Coal is loaded from the bucket 5 into the hopper 7 from which the same is fed upon the belt by any suitable advancing or feeding means such as 32, if such is found necessary or desirable. This feeding means may assume the form of a conveyor or agitating slide which may be actuated by shaft 31 driven from the conveyor terminal 12 upon the frame of the truck. It is also practicable to allow the coal to drop by gravity from the hopper 7 to the traveling belt 25. Lateral walls 33 of the feeding mechanism direct the coal upon the belt conveyor 25 to be carried upwardly to its opposite terminal. Loading idlers 22 are mounted upon the frame to give support to the conveyor at this point.

Loading idlers 21 may be positioned under the upper flight of the conveyor 25 so long as the same do not interfere with the movement of the cariage 6 into its upper positions. Additional idlers 50 may be disposed at the point indicated as well as at any other point in the travel of the conveyor to give the proper support to the belt at any point desired. These idling rollers also provide a convenient means for varying the profile of the conveyor belt with reference to the existing contour of the river bank and the presence of buildings upon the shore.

The coal is conveyed to the upper terminal of the conveyor at roller 13, from which point the same may be distributed by suitable chutes 38, 39, 40 and 41 to bins or to a tipple for screening purposes, depending upon requirements.

Various changes in the form and minor details in the invention may be resorted to at will, without departing from the spirit and scope thereof.

Having described my invention, I claim:—

1. A conveyor system comprising a movable truck, an inclined track for said truck, a conveyor belt terminal roller journalled on said truck, a conveyor belt trained over said roller, a hopper mounted on said truck and adapted to discharge material onto said conveyor belt, a terminal roller at a higher level than said truck a stationary mounting for said last-mentioned roller, separated from said truck, at the opposite end of said conveyor belt, and idler pulleys relatively movable to each other under said conveyor belt over which said belt is trained in a reverse loop, whereby the slack in said belt can be taken up as said truck is moved.

2. A conveyor system comprising a movable truck, an inclined track for said truck, a conveyor belt terminal roller journalled on said truck, a conveyor belt trained over said roller, a hopper mounted on said truck and adapted to discharge material onto said conveyor belt, a terminal roller at a higher level than said truck, a stationary mounting for said last-mentioned roller, separated from said truck, at the opposite end of said conveyor belt, driving means connected to said last mentioned terminal roller, and idler pulleys relatively movable to each other under said conveyor belt over which said belt is trained in a reverse loop, whereby the slack in said belt can be taken up as said truck is moved.

3. In a material handling apparatus for transferring material from a vessel floating on a body of water of varying level to a station on shore, a movable truck on the bank of the shore adapted to be maintained above the level of the body of water, an inclined track for said truck, a hopper on said truck for receiving the material unloaded from said vessel, a conveyor belt terminal roller journalled on said truck, an endless conveyor belt trained over said roller for receiving the material discharged from said hopper, a terminal roller at a higher level than said truck, a stationary mounting for said last-mentioned roller, separated from said truck, at the opposite end of said conveyor belt at a distributing point for the material at said shore station, idler pulleys for training the lower flight of said endless conveyor belt in a reverse loop comprising a movable idler pulley at the head of said loop, and tensioning means acting upon said last mentioned idler pulley for taking up the slack in said belt as said truck is moved.

4. In a material handling apparatus for transferring material from a vessel floating on a body of water of varying level to a station on shore, a movable truck on the bank of the shore adapted to be maintained above the level of the body of water, an inclined track for said truck, a hopper on said truck for receiving the material unloaded from said vessel, a conveyor belt terminal roller journalled on said truck, an endless conveyor trained over said roller, means for feeding the material from said hopper upon said conveyor, a terminal roller at a higher level than said truck, a stationary mounting for said last-mentioned roller, separated from said truck, at the opposite end of said conveyor belt at a distributing point for the material at said shore station, idler pulleys for training the lower flight of said endless conveyor belt in a reverse loop comprising a movable idler pulley at the head of said loop, and tensioning means acting upon said last mentioned idler pulley for taking up the slack in said belt as said truck is moved.

5. In a material handling apparatus for transferring material from a vessel floating on a body of water of varying level to a station on shore, a movable truck on the bank of the shore adapted to be maintained above the level of the body of water, an inclined track for said truck, a hopper on said truck for receiving the material unloaded from said vessel, a conveyor belt terminal roller journalled on said truck, one or more loading idler pulleys mounted on said truck for supporting said conveyor belt at the point of loading thereof, a terminal roller at a higher level than said truck, a stationary mounting for said last-mentioned roller, separated from said truck at the opposite end of said conveyor belt at a distributing point for the material at said shore station, idler pulleys for training the lower flight of said endless conveyor belt in a reverse loop comprising a movable idler pulley at the head of said loop, and tensioning means acting upon said last mentioned idler pulley for taking up the slack in said belt as said truck is moved.

6. In a material handling apparatus for transferring material from a vessel floating on a body of water of varying level to a station on shore, a movable truck on the bank of the shore adapted to be maintained above the level of the body of water, an inclined track for said truck, a hopper on said truck for receiving the material unloaded from said vessel, a conveyor belt terminal roller journalled on said truck, an endless conveyor belt trained over said roller for receiving the material discharged from said hopper, a terminal roller at a higher level than said truck, a stationary mounting for said last-mentioned roller, separated from said truck, at the opposite end of said conveyor belt at a distributing point for the material at said shore station, a plurality of loading idlers along the travel of the conveyor belt for supporting and varying the course thereof, idler pulleys for training the lower flight of said endless conveyor belt in a reverse loop comprising a movable idler pulley at the head of said loop, and tensioning means acting upon said last mentioned idler pulley for taking up the slack in said belt as said truck is moved.

7. A conveyor system comprising a movable truck, an inclined track for said truck, a conveyor belt terminal roller journalled on said truck, a conveyor belt trained over said roller, a hopper mounted on said truck and adapted to discharge material onto said conveyor belt, a terminal roller at a higher level than said truck, a stationary mounting for said last-mentioned roller, separated from said truck, at the opposite end of said conveyor belt, and a plurality of relatively movable pulleys for guiding said conveyor belt and to take up the slack in said belt as said truck is moved.

8. A conveyor system comprising a movable truck, an inclined track for said truck, a conveyor belt terminal roller journalled on said truck, a conveyor belt trained over said roller, a hopper mounted on said truck and adapted to discharge material onto said conveyor belt, a terminal roller at a higher level than said truck, a stationary mounting for said last-mentioned roller, separated from said truck, at the opposite end of said conveyor belt, a plurality of fixed pulleys for guiding said conveyor belt in a loop, a movable idler pulley at the head of said loop, and tensioning means acting upon said movable idler pulley for taking up the slack in said belt as said truck is moved.

9. A conveyor system comprising a movable truck, an inclined track for said truck, a conveyor belt terminal roller journalled on said truck, a conveyor belt trained over said roller, a hopper mounted on said truck and adapted to discharge material onto said conveyor belt, a roller mounting, a terminal roller on said mounting for guiding and supporting the opposite end of said conveyor belt, and a plurality of relatively movable pulleys for guiding said conveyor belt and to take up the slack in said belt as said truck is moved.

FERDINAND C. MENK.